US 6,566,483 B2

(12) United States Patent
Cho et al.

(10) Patent No.: US 6,566,483 B2
(45) Date of Patent: May 20, 2003

(54) PHOTOSENSITIVE PHOSPHORYLATED PHENOL-FORMALDEHYDE RESIN AND METHOD FOR PREPARING THE SAME

(75) Inventors: Ching-Sheng Cho, Taipei Hsien (TW); Shinn-Jen Chang, Hsinchu (TW); Wan-Jung Teng, Hsinchu Hsien (TW); Jiun-Ji Chen, Tainan (TW)

(73) Assignee: Industrial Technology Research Institute, Chutung (TW)

( * ) Notice: Subject to any disclaimer, the term of this patent is extended or adjusted under 35 U.S.C. 154(b) by 64 days.

(21) Appl. No.: 09/963,420

(22) Filed: Sep. 27, 2001

(65) Prior Publication Data

US 2002/0111454 A1 Aug. 15, 2002

(30) Foreign Application Priority Data

Dec. 15, 2000 (TW) ........................................ 89126878 A

(51) Int. Cl.$^7$ ........................... C08G 14/04; C08G 8/10; C08F 6/06
(52) U.S. Cl. ........................ 528/129; 528/167; 528/169; 528/174; 528/487
(58) Field of Search ................................ 528/129, 167, 528/169, 174, 487

(56) References Cited

FOREIGN PATENT DOCUMENTS

| JP | 2-003454 | * | 1/1990 |
| JP | 2-153902 | * | 6/1990 |
| JP | 9-328571 | * | 9/1997 |

* cited by examiner

*Primary Examiner*—Duc Truong
(74) *Attorney, Agent, or Firm*—Sughrue Mion, PLLC

(57) ABSTRACT

This invention discloses a photosensitive phosphorylated phenol-formaldehyde resin, characterized by containing in its molecule at least two phosphate groups, each phosphate group coupled with at least one photo-sensitive group. The photosensitive resin of the present invention is prepared by reacting a phenol-formaldehyde resin with phosphorus oxychloride to form a phosphorylated phenol-formaldehyde resin; then reacting the resin with a compound having one hydroxyl group and at least one ethylenically unsaturated bond, thereby esterifying some of the phosphorochloridate groups to produce a resin having ethylenically unsaturated bonds and unreacted phosphorochloridate groups; and hydrolyzing the unreacted phosphorochloridate groups into phosphoric groups. The photosensitive resin according to the invention is UV-curable and alkaline-soluble as traditional photosensitive resins are; moreover, it exhibits good flame retardant and adhesive properties.

20 Claims, No Drawings

PHOTOSENSITIVE PHOSPHORYLATED PHENOL-FORMALDEHYDE RESIN AND METHOD FOR PREPARING THE SAME

BACKGROUND OF THE INVENTION

1. Field of the Invention

The present invention relates to a novel photosensitive phosphorylated phenol-formaldehyde resin and method for preparing the same. The phosphorylated phenol-formaldehyde resin is curable under UV light and soluble in alkaline solution; moreover, it exhibits good flame-retardant and adhesive properties.

2. Description of the Prior Art

Photosensitive resins have been widely used in coating materials, adhesives, printing inks, printed resin boards, printed circuit boards and semiconductors thanks to their characteristics, such as non-solvent-producing, high production efficiency due to short curing time, low investment costs due to small equipment volume needed for manufacturing, and others. Recently, the processing conditions for manufacturing circuit boards and electronic devices have gotten more strict, creating the need for a photosensitive resin with more integrated functions. The important functions concerned are flame retardancy, and good adhesion with metal or other substrates.

The flame retardant property of conventional photosensitive resin composition is generally achieved by adding halogen compounds. This method, however, has its drawbacks. Using brominated epoxy resin as an example, although there is a certain degree of flame retardancy, it produces large amounts of corrosive and toxic hydrogen bromine gas. In addition, dioxin may be generated.

Another conventional flame retardant is phosphoric compound. It has low toxicity, is less smoky, has better compatibility with resin and good workability, and requires lower dosage for use. Moreover, it improves the adhesion between resin and metals or other substrates. Its use is, therefore, an inevitable trend.

In Japanese Patent Application Laid-Open No. 9-328571, an aromatic organic phosphate compound is added to obtain a resin composition with good flame retardance, and good resistance to heat and shock.

Also, in Japanese Patent Application Laid-Open No. 2-153902, a phosphorous-containing acrylic monomer is added to an epoxy acrylate photosensitive resin composition to improve the adhesive strength of the resin.

In Japanese Patent Application Laid-Open No. 2-003454, adhesion is improved by adding a phosphate photosensitive monomer to an epoxy acrylate photocurable resin composition, which is used as a solder or plating resist in the manufacture of printed circuit boards.

In the above-mentioned patent applications, by adding phosphorous-containing photosensitive monomers to the resin composition, the viscosity of the resin is lowered, and the adhesive strength between the resin and substrate is improved. However, the phosphorous compound of a low molecular weight easily migrates and vaporizes to degrade the physical properties and flame retardancy. In addition, since the phosphorous-containing photosensitive monomer is irritating, it cannot be added in a large amount. Consequently, its application as a flame retardant is rather restricted.

The following articles relate to phosphorous-containing epoxy acrylate photosensitive resins. U.S. Pat. No. 5,512, 607 discloses reacting a cresol novolak type epoxy resin with a carboxylic acid having an ethylenically unsaturated group to esterify some of the epoxy groups, and then reacting the unreacted epoxy groups with a tertiary amine as well as phosphoric acid to form a photosensitive resin containing quaternary ammonium phosphate groups. In Japanese Patent Application Laid-Open No. 7-157711, a water-soluble coating composition is prepared by reacting a phosphorylated epoxy resin with a polymerizable monocarboxylic acid having an ethylenically unsaturated bond.

SUMMARY OF THE INVENTION

The object of the present invention is to provide a novel photosensitive phosphorylated phenol-formaldehyde resin which is curable under UV light and soluble in alkaline solutions.

Another object of the invention is to provide a photosensitive phosphorylated phenol-formaldehyde resin which is flame retardant and promotes adhesion. Thus, the environmental pollution problems caused by conventional halogenated flame retardant will be eliminated, and the adhesion between the photosensitive resin and substrate can be improved.

To achieve the above-mentioned objects, the novel photosensitive phosphorylated phenol-formaldehyde resin of the invention is characterized by having at least two phosphate groups in its molecule, and each phosphate group is coupled with at least one photosensitive group. The photosensitive phosphorylated phenol-formaldehyde resin is prepared by reacting phenol-formaldehyde resin with phosphorus oxychloride ($POCl_3$) to form a phosphorylated phenol-formaldehyde resin; then reacting the resin with a photosensitive compound having an hydroxyl group and at least one ethylenically unsaturated bond to proceed dehydrochlorination, so that a photosensitive group is introduced into the resin. Finally, the unreacted phosphorochloridate group is hydrolyzed into a phosphoric group.

DETAILED DESCRIPTION OF THE INVENTION

According to the preparation method of the invention, a phenol-formaldehyde resin with repeating unit (I) and $POCl_3$ are reacted to form a phenol-formaldehyde resin with repeating unit (II), wherein $R_1$ represents $C_{1-6}$ alkylene or $C_{6-10}$ alicyclic ring; and $R_2$ represents hydrogen or methyl.

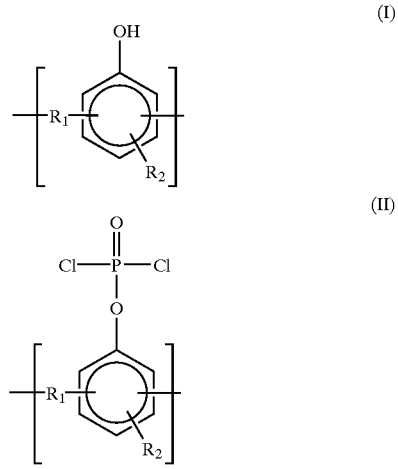

The reaction ratio between $POCl_3$ and the phenol-formaldehyde resin is not specifically restricted. However, it is preferable to set the ratio of moles of POCl₃ to the phenol equivalent of the phenol-formaldehyde resin at 0.5–1.3.

Moreover, the phenol-formaldehyde resin used in this invention is not specifically limited, as long as it can be phosphorylated by POCl₃. Examples of the phenol-formaldehyde resins are: phenol series phenol-formaldehyde resin, formaldehyde series phenol-formaldehyde resin and alicyclic series phenol-formaldehyde resin.

Next, the phosphorylated phenol-formaldehyde resin with repeating unit (II) is reacted with a photosensitive compound (III) having an hydroxyl group and at least one ethylenically unsaturated bond in its molecule to proceed dehydrochlorination. Thereby, a phosphate group having an ethylenically unsaturated bond is coupled to the phenol-formaldehyde resin as shown in formula (IV),

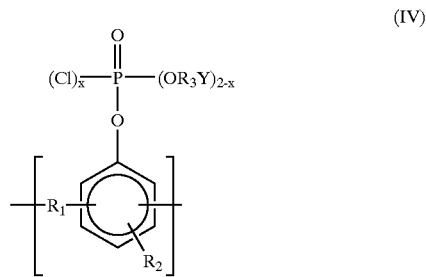

(IV)

wherein, $R_1$ and $R_2$ have the meaning described above; $R_3$ is $C_{2-6}$ straight-chain or branched alkylene and optionally substituted with heteroatoms or aryl groups; Y is a functional group having an ethylenically unsaturated bond; and x is 0 or 1.

The reaction ratio between the photosensitive compound (III) and the phenol-formaldehyde resin (with repeating unit (I)) is not specifically restricted. However, it is preferable to set the ratio of moles of photosensitive compound (III) to the phenol equivalent of the phenol-formaldehyde resin at 0.5–1.5.

The photosensitive compound (III) used in this invention is not limited, as long as it contains an hydroxyl group and at least one ethylenically unsaturated bond in its molecule. For example, the photosensitive compound can be a compound containing an hydroxyl group and at least one acrylate group in each molecule, or a compound containing an hydroxyl group and at least one methacrylate group in its molecule. Preferable photosensitive compounds include hydroxyethyl acrylate, hydroxyethyl methacrylate, hydroxypropyl acrylate, hydroxypropyl methacrylate, hydroxybutyl acrylate, and hydroxybutyl methacrylate.

Finally, the unreacted phosphorochloridate groups in the above phenol-formaldehyde system are hydrolyzed into phosphoric groups to obtain the phosphorylated phenol-formaldehyde resin of the invention, which contains repeating unit (V):

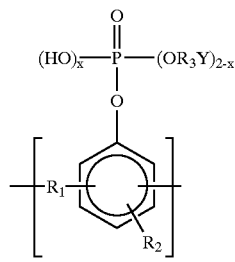

(V)

wherein, $R_1$, is $C_{1-6}$ alkylene or $C_{6-10}$ alicyclic ring; $R_2$ is hydrogen or methyl; $R_3$ is $C_{2-6}$ straight-chain or branched alkylene and optionally substituted with heteroatoms or aryl groups; Y is a functional group having an ethylenically unsaturated bond; and x is 0 or 1.

In addition, the reactant system may contain a phenol-formaldehyde resin with repeating unit (I) and a phosphorylated phenol-formaldehyde resin with repeating unit (VI) that is not coupled with a photosensitive group:

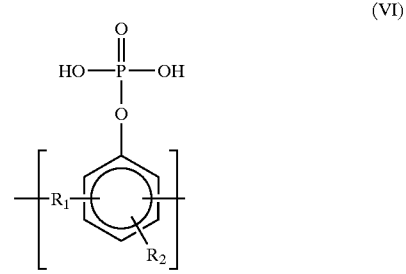

(VI)

wherein $R_1$, and $R_2$ have the meaning described above.

The photosensitive phosphorylated phenol-formaldehyde resin of the invention contains a functional group having an ethylenically unsaturated bond (such as acrylate group or methacrylate group). Hence it is UV-curable as the conventional photosensitive resins are. Moreover, the phosphate group contained in the resin is able to promote the adhesion between resin and substrate, and to improve the flame retardancy after the resin is cured. The limiting oxygen index (LOI) of the photosensitive resin composition of the invention is generally greater than 26, and a value of greater than 45 can be obtained in a preferred embodiment.

In the preferred embodiments of the invention, Y represents an acrylate group or a methacrylate group. In the most preferred embodiments of the invention, $R_1$ is $CH_2$; $R_2$ is hydrogen or $CH_3$; $R_3$ is $CH_2$ or $CH_2CH_2$; the number of the repeating unit (I) of the phenol-formaldehyde resin is 1–10; the number of the repeating unit (V) of the phosphorylated phenol-formaldehyde resin is 1–5.

The photosensitive phosphorylated phenol-formaldehyde resin of the invention can be mixed with a photoinitiator to give a resin composition that is curable under UV light. Suitable photoinitiators include benzophenone, benzoin, benzoin alkyl ether, and acetophenones. The amount of the photoinitiator is about 0.1–25 wt % of the photosensitive resin, preferable 0.1–10 wt % of the resin.

The novel photosensitive phosphorylated phenol-formaldehyde resin can be used alone or with other photosensitive resins. Therefore, the above photosensitive composition may further comprise a second photosensitive resin different from the photosensitive phosphorylated phenol-formaldehyde resin, such as epoxy acrylate resin. Moreover, other additives such as thermosetting resin and thermocuring initiators can be added.

Diluents can be added to adjust the viscosity of the resin composition. Suitable diluents include reactive monomers such as trimethylolpropane triacrylate, pentaerythritol tetracrylate, and tetraglycol diacrylate.

In addition to the above-mentioned main components, other conventional additives can be present in the resin composition of the present invention. Such additives include thermal stabilizers, antioxidants, photo-stabilizers, lubricants, colorants (such as dyes, pigments), various types of fillers and reinforcing agents.

The phosphorous-containing resin composition can be used as electronic device molding compounds, solder masks for printed circuit boards, photosensitive insulating dielectric materials and photo-curable coating materials for all sorts of substrates.

The scope of the invention also includes cured product of the photosensitive resin composition, which can be either photo-cured or thermo-cured. By using the phosphorous-containing photosensitive resin composition of the invention, the cured product has better flame retardancy and adhesion.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

The formulas of the compounds used in the examples follow:

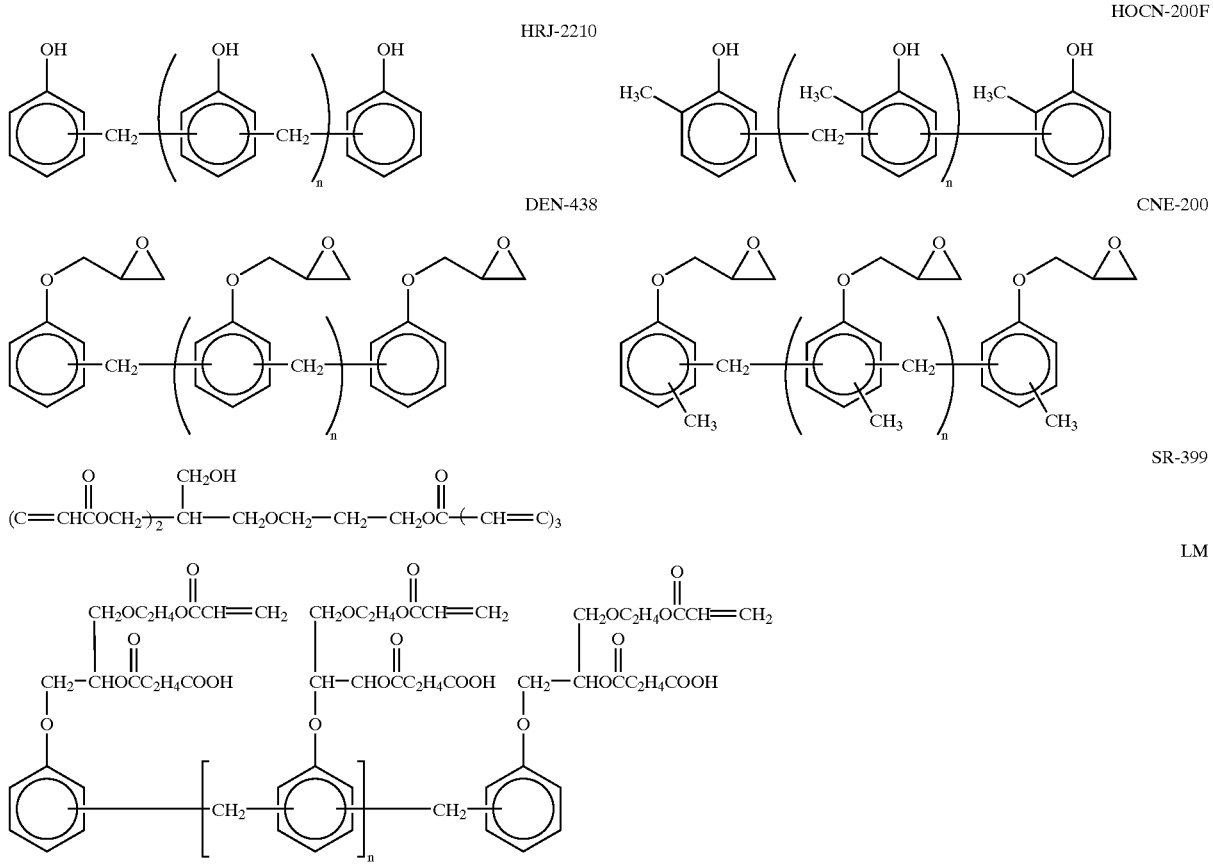

EXAMPLE 1

A THF solution of 88.3 g of $POCl_3$ and 0.64 g of anhydrous aluminum chloride was charged into a one liter, four-neck reaction vessel equipped with a stirrer, a distilling column, a nitrogen inlet and a dropping funnel. The temperature was controlled at 50–65° C. A THF solution of 51.4 g of phenol-formaldehyde resin HRJ-2210 (Novolaks type, Mn=442 g/mole, available from Schenectady International) was dripped into the reaction mixture within two hours. After this, a suitable amount of triethyl amine was added to neutralize the solution, and the salts produced were filtered out. Then, the remaining $POCl_3$ was removed by distillation under reduced pressure. Thereafter, a THF solution of 67 g of hydroxyethyl acrylate and 65 g of triethyl amine was dripped into the reaction mixture. The reaction temperature was controlled at 50–65° C. After the solution was completely dripped, the mixture was stirred for 2–20 hours. After this time, the reaction mixture was filtered, washed with water, dried and concentrated to give a photosensitive phosphorylated phenol-formaldehyde resin. IR (KBr) spectrum shows peaks at the following wavelengths: 3434 cm$^{-1}$(—OH), 2951 cm$^{-1}$(—$CH_2$—), 1727 cm$^{-1}$(C=O), 1270 cm$^{-1}$ (P=O), 1080 cm$^{-1}$(P—O—C). The results of the $^1$H-NMR (DMSO-d6) spectrum are: δ=3.4–4.2, 5.8, 6.0, 6.2, 6.7–6.9 ppm. The flame retardancy of the dried resin was assessed by heating weight loss analysis and LOI. The results are shown in Table 1. The average molecular weight of the resin is about 1200 g/mole.

EXAMPLE 2

The procedure outlined in Example 1 was repeated except that the phenol-formaldehyde resin was replaced by HOCN-200F (Cresol-Novolaks type, Mn=1100 g/mole, available from Chun Chang Chemcial CO.,). The average molecular weight of the resin obtained is about 1900 g/mole. The IR and NMR spectrums are the same as those of Example 1.

COMPARATIVE EXAMPLE 1

300 g of an epoxy resin (CNE-200 available from Chun Chang Chemcial CO.,), 147 g of acrylic acid, 2 g of dimethyl aniline and 200 ml of methoxy acetate were charged in a one liter, four-neck reaction vessel equipped with a stirrer, a distilling column, a nitrogen inlet. The reaction temperature was controlled at 90–110° C. After continuous stirring for 12 hours, an epoxy acrylate resin was obtained by concentration under reduced pressure. The flame retardancy of the dried resin was assessed by heating weight loss analysis and LOI, which are listed in Table 1.

EXAMPLE 3

The photosensitive phosphorylated phenol-formaldehyde resin of Example 1 as a binder, a Novolac type epoxy resin (DEN438; available from Dow Chemical), a thermo-curing accelerator (dimethyl aniline; BDMA), a photoinitiator (Irgacure-907; available from Ciba Geigy), a photo-curing catalyst (Speedcure-ITX; available from Ciba Geigy) and a photosensitive monomer with five acrylate groups (SR-399; available from Chembridge Interantional Co.,) were reacted to form a phosphorous-containing photosensitive resin composition. The weight percentage of each component is listed in Table 2. After prebaking at 80° C. for 30 minutes, the composition was cured under UV exposure (1000 mJ/cm$^2$). Then, it was baked at 150° C. for 1 hour. The flame retardancy of the dried resin was assessed by heating weight loss analysis and LOI. On the other hand, the photosensitive resin composition was coated on a copper foil and cured with the same conditions as set forth above. For adhesion properties, the film was cross-cut in a checkerboard fashion, and ordinary cellophane tape was pasted on the surface and pulled. The number of small squares not peeled off from the surface (total number of small checker board squares was 100) was counted. The assessment results are listed in Table 3.

COMPARATIVE EXAMPLE 2

The procedure outlined in example 3 was repeated except that the phenol-formaldehyde resin of Embodiment 1 was replaced by an epoxy acrylate resin (LM; available from AGI Corporation).

TABLE 1

|  | heating weight loss (in N$_2$) | | heating weight loss (in air) | | |
| --- | --- | --- | --- | --- | --- |
|  | T$_{max}$ (° C.) | Char Yield (%, 800° C.) | T$_{max}$ (° C.) | Char Yield (%, 800° C.) | LOI (%) |
| Example 1 | 479 | 29.0 | 793 | 1.9 | 45.9 |
| Com. Example 1 | 403 | 6.1 | 420 | 1.3 | 23.3 |

Note:
T$_{max}$: the lowest degradation temperature

TABLE 2

| Composition (wt %) | Binder | DEN438 | BDMA | Irgacure-907 | Speedcure-ITX | SR-399 |
| --- | --- | --- | --- | --- | --- | --- |
| Example 3 | 59.7 | 10.2 | 0.1 | 8.0 | 2.0 | 20 |
| Com. Example 2 | 59.7 | 10.2 | 0.1 | 8.0 | 2.0 | 20 |

TABLE 3

|  | heating weight loss (in N$_2$) | | heating weight loss (in air) | | | |
| --- | --- | --- | --- | --- | --- | --- |
|  | T$_{max}$ (° C.) | Char Yield (%, 800° C.) | T$_{max}$ (° C.) | Char Yield (%, 800° C.) | LOI (%) | Adhesion |
| Example 3 | 391 | 35.5 | 394 | 15.5 | 29.8 | 100/100 |
| Com. Example 2 | 368 | 12.3 | 405 | 0.3 | 24.2 | 100/100 |

Note:
T$_{max}$: the lowest degradation temperature

As can be seen in Tables 1 and 3, regardless of the photosensitive resin itself or the cured photosensitive resin composition material, those using the photosensitive phosphorylated phenol-formaldehyde resin of the invention had a higher char yield than the one using conventional epoxy acrylate resins. Also, the LOIs are higher than those of the conventional epoxy acrylate resins. Therefore, the photosensitive phosphorylated phenol-formaldehyde resin of the invention has better flame retardancy, and due to the fact that it is free of halide compounds, it will not produce corrosive and toxic hydrogen halide when burned. This helps to improve safety during use. Moreover, the adhesion of the photosensitive phosphorylated phenol-formaldehyde resin with copper foils is satisfactory.

What is claimed is:
1. A phosphorylated phenol-formaldehyde resin having at least two phosphate groups, wherein each phosphate group is coupled with at least one photosensitive functional group having an ethylenically unsaturated bond.

2. The phosphorylated phenol-formaldehyde resin as claimed in claim 1, wherein the photosensitive functional group is a methacrylate group or an acrylate group.

3. A photosensitive phosphorylated phenol-formaldehyde resin comprising the following repeating unit,

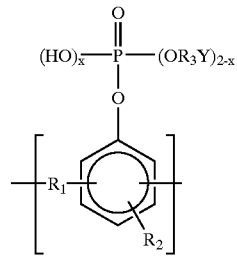

wherein $R_1$, is $C_{1-6}$ alkylene or $C_{6-10}$ alicyclic ring; $R_2$ is hydrogen or methyl; $R_3$ is $C_{2-6}$ straight-chain or branched alkylene and optionally substituted with heteroatoms or aryl groups; Y is a functional group having an ethylenically unsaturated bond; and x is 0 or 1.

4. The photosensitive phosphorylated phenol-formaldehyde resin as claimed in claim 3, wherein Y is a methacrylate group or an acrylate group.

5. The photosensitive phosphorylated phenol-formaldehyde resin as claimed in claim 3, wherein Y is a methacrylate group or an acrylate group, $R_1$ is $CH_2$, $R_2$ is H or $CH_3$, and $R_3$ is $CH_2CH_2$.

6. The photosensitive phosphorylated phenol-formaldehyde resin as claimed in claim 3, wherein the number of the repeating units is 1–5.

7. The photosensitive phosphorylated phenol-formaldehyde resin as claimed in claim 3, further comprising the following repeating unit:

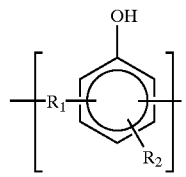

wherein, $R_1$ and $R_2$ have the meaning described in claim 3.

8. The photosensitive phosphorylated phenol-formaldehyde resin as claimed in claim 3 further comprising the following repeating unit:

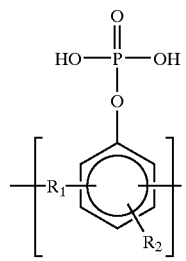

wherein, $R_1$ and $R_2$ have the meaning described in claim 4.

9. The photosensitive phosphorylated phenol-formaldehyde resin as claimed in claim 7, wherein $R_1$ is $CH_2$, and $R_2$ is H or $CH_3$.

10. The photosensitive phosphorylated phenol-formaldehyde resin as claimed in claim 8, wherein $R_1$ is $CH_2$, and $R_2$ is H or $CH_3$.

11. The photosensitive phosphorylated phenol-formaldehyde resin as claimed in claim 3, which is used as a flame retardant.

12. The photosensitive phosphorylated phenol-formaldehyde resin as claimed in claim 3, which is used as an adhesion promoter.

13. A photosensitive resin composition, comprising:
    (a) a photosensitive phosphorylated phenol-formaldehyde resin according to claim 1; and
    (b) 0.1–25 wt % of a photoinitiator, based on the weight of the phosphorylated phenol-formaldehyde resin.

14. The photosensitive resin composition as claimed in claim 13, further comprising a second photosensitive resin.

15. The photosensitive resin composition as claimed in claim 14, wherein the second photosensitive resin is an epoxy acrylate resin.

16. A method of preparing a photosensitive phosphorylated phenol-formaldehyde resin, comprising the steps of:

reacting a phenol-formaldehyde resin with phosphorus oxychloride to form a phenol-formaldehyde resin having phosphorochloridate groups;

reacting the phosphorochloridate groups of the phenol-formaldehyde resin with a compound having an hydroxyl group and at least one ethylenically unsaturated bond to form a phosphate group having an ethylenically unsaturated bond; and hydrolyzing the unreacted phosphorochloridate groups of the phenol-formaldehyde resin to a phosphoric acid group to form a phosphorylated phenol-formaldehyde resin with the following repeating unit:

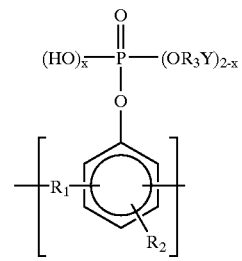

wherein $R_1$ is $C_{1-6}$ alkylene or $C_{6-10}$ alicyclic ring; $R_2$ is hydrogen or methyl; $R_3$ is $C_{2-6}$ straight-chain or branched alkylene and optionally substituted with heteroatoms or aryl groups; Y is a functional group having an ethylenically unsaturated bond; and x is 0 or 1.

17. The method as claimed in claim 16, wherein the photosensitive phosphorylated phenol-formaldehyde resin further comprising the following repeating unit:

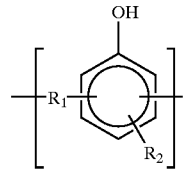

wherein, $R_1$ and $R_2$ have the meaning described in claim 16.

18. The method as claimed in claim 16, wherein the photosensitive phosphorylated phenol-formaldehyde resin further comprising the following repeating unit:

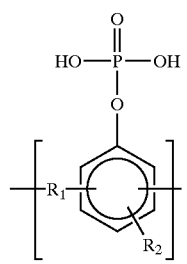

wherein, $R_1$, and $R_2$ have the meaning described in claim 16.

19. The method as claimed in claim 16, wherein the compound having an hydroxyl group and at least one ethylenically unsaturated bond is selected from the group consisting of a compound having an hydroxyl group and at least one acrylate group in its molecule, and a compound having an hydroxyl group and at least one methacrylate group in its molecule.

20. The method as claimed in claim 16, wherein the compound is selected from the group consisting of hydroxyethyl acrylate, hydroxyethyl methacrylate, hydroxypropyl acrylate, hydroxypropyl methacrylate, hydroxybutyl acrylate, and hydroxybutyl methacrylate.

* * * * *